Sept. 6, 1955  R. J. MINNIE III  2,716,832
FISHING LINE SINKER
Filed April 24, 1953
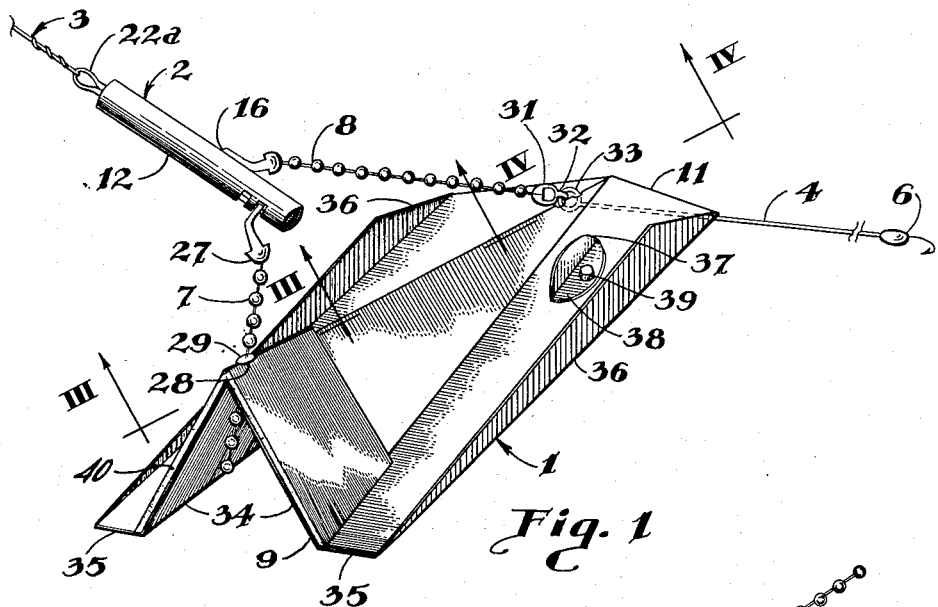
Fig. 1
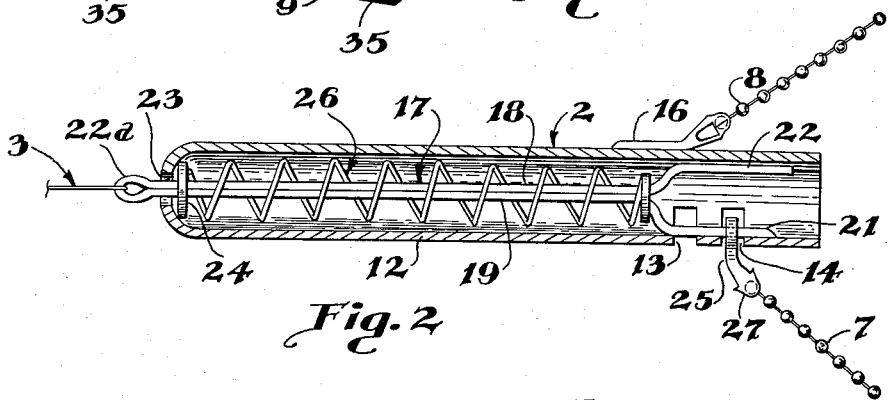
Fig. 2
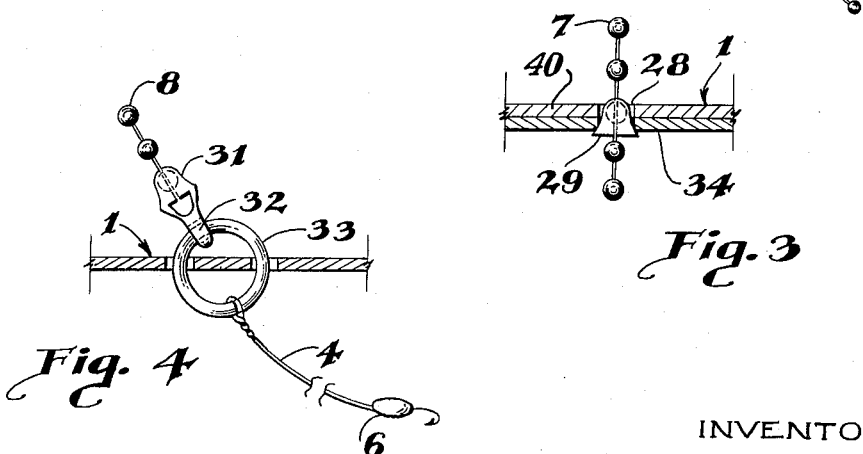
Fig. 3
Fig. 4
INVENTOR
RAYMOND J. MINNIE III
BY George Sipkin
ATTORNEYS United States Patent Office 2,716,832
Patented Sept. 6, 1955

2,716,832

FISHING LINE SINKER

Raymond J. Minnie III, Vallejo, Calif.

Application April 24, 1953, Serial No. 351,063

7 Claims. (Cl. 43—43.12)

(Granted under Title 35, U. S. Code (1952), sec. 266)

This invention may be manufactured and used by or for the Government of the United States of America for governmental purposes without payment of any royalties thereon or therefor.

This invention relates to fishing tackle, and, more particularly, to releasable sinkers.

Such sinker mechanisms are well known and have been in rather common use by trolling fishermen as a means for weighting their lines sufficiently to permit trolling at the depths where the larger fish feed. Although these sinkers have been found to operate satisfactorily, the particular type of sinkers now in use are uneconomical, inefficient and difficult to handle and transport. These disadvantages all stem from the fact that most of the sinkers have been formed of heavy ball or triangular weights adapted at their upper ends to be engaged by sinker release mechanisms which, in turn, are provided at their trailing ends with means for securing the hook leader. Also, a spring-pressed arm adapted to be coupled to the trolling leader usually projects outwardly through the forward end of the mechanism, this arm mounting a compression spring adapted to press it into a sinker-engaging position. The arrangement is such that, when a pull is exerted on the hook, either by fouling or by the strike of a fish, the spring compresses and permits the arm to withdraw from its sinker engagement and release the weight. Such a sinker-release mechanism is shown in U. S. Patent 2,562,054 issued July 24, 1951, to H. J. Mathieu, and the mechanism there shown has been found to function in a most satisfactory manner.

However, as previously noted, the weights used in this practice not only are heavy and cumbersome to transport and use, but also they are rather costly, and, since they must be jettisoned and completely lost each time a catch is made, their use has represented an unnecessarily wasteful procedure. It also will be appreciated that such sinkers must be jettisoned to permit the angler to effectively play his line after the strike, since if the weight remained on the line, the angler would have insufficient feel and consequent ability to control the situation.

It is, therefore, an object of the present invention to provide sinker mechanism which is capable of carrying the line to the desired depth and which, when the line is reeled-in, represents such a negligible weight as to permit the sinker to be permanently secured to the line.

Another object is to provide an inexpensive sinker mechanism adapted to be secured as a relatively permanent element of the fishing tackle and also adapted to be adjusted with respect to the tackle so as to selectively seek greater or lessor depth.

Other objects and many of the attendant advantages of the invention will be readily appreciated as the same becomes better understood.

In a general manner, the objects of the invention are achieved both by the used of a vane in place of the conventional ball weights and by the manner in which this vane is formed and suspended or carried through the water. The vane acts with what may be called a planing action in that, when its front end is depressed a certain degree, it becomes a depth-seeking or digging device, while when a pull is exerted on its rear or trailing end, it becomes a surface-seeking device. In the preferred form, the leading end of the vane is releasably suspended from a casing, while the trailing end is swingably connected to the same casing. The support thereby provided normally is such that the trailing end is carried in an elevated position to place the leading end in a depth-seeking inclination. As presently contemplated, the casing mounts a resiliently releasable latch which may be secured externally of the casing to a trolling line, and the arrangement is such that, when a pull is exerted on the vane, the swingable connection between the vane and the casing actuates the latch and releases the leading end of the vane. Obviously, the latch actuating pull may be the force of a striking fish, and, when the leading edge of the vane is released, the vane then is free to pivot so as to dispose its trailing end in an upwardly inclined, surface-seeking inclination. Consequently, the vane will dig and carry the line to its desired depth until such a time as the fish strikes or the hook becomes fouled on some foreign object and, at that time the vane then swings or pivots into the so-called surface-seeking inclination.

It also is desirable to provide means for adjusting the depth-seeking inclination of the leading edge and, most suitably, this can be accomplished by using a leading edge suspension means which is variable in length. Also, operation of the vane is materially improved if the vane is so shaped that it will not rotate about its longitudinal axis during its level-seeking movements, and this can be achieved by forming the vane with a W-shaped cross-section.

The preferred embodiment of the invention is illustrated in the accompanying drawings of which Fig. 1 is a front perspective showing the vane supported by its releasing mechanism; Fig. 2 a longitudinal section through the release mechanism, and Figs. 3 and 4 sections taken along lines III—III and IV—IV respectively of Fig. 1.

Referring to the drawings, the apparatus is formed of two principal elements, one of which is a trolling planer or vane 1 and the other a vane-supporting mechanism 2. When in use, the vane-supporting mechanism is secured to a line 3, while the rear end of the vane trails a leader 4 on the end of which is secured a fish hook 6, and, as may be noted, the vane is suspended, or freely-swung, from its support by means of bead chains 7 and 8. The leading, or so-called depth-seeking end 9 of the vane is supported by chain 7 and trailing or surface-seeking end 11 by chain 8, the suspension being such as to releasably support leading end 9 in a depth-seeking inclination, and, in addition, under certain circumstances, to release this leading end and permit the vane as a whole to swing into a surface-seeking inclination.

For this purpose, the vane-supporting mechanism, preferably, is formed of a hollow elongate casing 12 provided toward the rear of its lower portion with a pair of slit openings 13, 14, and also provided along its upper surface with a bead chain coupling member 16 most clearly shown in Fig. 2. To permit the desired releasing action a plunger 17 is provided, this member being formed of a pair of arms 18 and 19 which extend longitudinally through the interior of the casing and which diverge at their rear portions to form laterally-spaced latches 21 and 22. As may be noted, plunger 17 simply is a reversely-bent rod with its bent portion slightly expanded to form an eye 22a adapted to project outwardly through an opening 23 formed in the constricted front end of the casing. The plunger is spring-operated, and, accordingly, a washer 24 may be mounted interiorly of the casing around arms 18 and 19 and a coil spring 26 compressed between this washer and the outwardly diverging portions of latches 21 and 22 so as to normally urge these latches toward a rearward engaged position. In this rearward position one or the other of the latches is adapted to releasably engage bead chain 7, this engagement being accomplished by mounting another ball swivel coupling 27 on the upper end of chain 7 and forming the upper end of this coupling into a ring 25 through which the latch engageably extends. The other end of chain 7 is, as previously mentioned, secured to the leading end of vane 1 and this coupling is effected by providing an opening 28 in this leading end and by mounting a detachable bell-shaped anchor or securing member 29 to the chain. In practice, anchor 29 may be secured around any selected bead of the chain to reduce or lengthen the effective supporting length and, of course, the anchor is made larger than opening 28 so as to engage the vane. Additional adjustability is provided in that the coupling of the chain to the casing can be made through either one of the slit openings 13 or 14, and, in addition, either latch 21 or 22 may be used as desired.

Trailing end 11 of the vane also is supported by cylinder 12 and, for this purpose, chain 8 is provided at its rearward end with a coupling member 31 (Fig. 4), which is similar to coupling member 27 in that it has a ring 32 engaging another eye ring 33 that is permanently secured in openings provided in the vane. The purpose of ring 33 and coupling 31 is to provide a freely swingable connection between the casing and the vane.

The vane itself may assume any number of different shapes, although it is greatly to be desired that the shape selected be such that the vane as a whole will not rotate about its longitudinal axis as it moves through the water. As illustrated, the vane has an overall configuration formed of legs 34, 35 and 36 providing a W-shaped cross-section, and this particular configuration has been found to possess adequate stability. Also, it has been found desirable to have its legs 34 and 35 form an angle of approximately 145 degrees with each other and to have side legs 36 bent upwardly at an angle of about 90 degrees from legs 35. Another feature of the vane is that the leading end of legs 35 are beveled-off in a swept-back fashion so that, as the vane proceeds forwardly through the water, any objects striking the leading edge are fended off to one side or the other. Such a bevel is desirable to avoid the possibility of the vane becoming fouled in the lines of other fishermen. For a similar purpose, trailing edge 11, which sometimes becomes the leading edge, has the rear edges of its legs 35 disposed at a slight angle one to the other and, in the manner shown, its legs 36 are beveled to the extent that any line or other foreign object striking these surfaces will ride upwardly and will not become fouled on the vane.

In operation, the vane takes the place of the more conventional sinker weights, and it is secured in position by engaging chain 7 with either one of the latches of plunger 17. The length of chain 7 with respect to chain 8, then is adjusted, if necessary, to assure that the vane will be suspended in a depth-seeking inclination with its leading edge 9 lower than its trailing edge 11, and, as may be appreciated, a vane pulled through the water in such an inclined position normally will dig and, in other words, seek a depth. One of the principal advantages of the present arrangement is that the level to which the vane carries the line can be rather closely controlled by varying the depth-seeking inclination and, of course, this can be done by lengthening or shortening chain 7 in the manner previously described. Of course, if greater depths are desired, the leading end is permitted to drop to an increased inclination. Trolling is continued with the vane in its depth-seeking inclination until such time as a strike is made or until the hook becomes fouled on some foreign object such as a rock. At such time the force of the pull on the hook is transmitted through the vane and through chain 8 to casing 12 with a result that the casing is held relatively stationary while the trolling progress continues to exert a pull upon plunger 17. Such a pull, in turn, acts to compress spring 26 which, as would be expected, has such a compressive strength that the strike compresses it sufficiently to permit latches 21 or 22 to withdraw from their engagement with chain 7. Such withdrawal, of course, releases the leading end of the vane and permits the vane to swing or freely swing about its trailing end coupling, this swinging action automatically converting trailing end 11 into a leading end. The disposition of the vane after it has been released and swung into its desired reverse position is such that leading end 9 lies below trailing end 11, which then becomes the leading end. Any continued pull on line 3 then is exerted directly on end 11 and, since this end lies above end 9, the vane is in a surface-seeking inclination in which it can be reeled-in easily without imposing any appreciable pull or burden on the line. If at any time during trolling it is desired to reel in the vane, such as for inspecting or changing the bait, the above tripping action can be simulated by the fisherman by hauling back suddenly on the fishing rod which exerts an increased tension on the line to release chain 7. In this manner, the vane may be surfaced without resistance.

The principal advantages of this arrangement lie in the fact that the vane does not have to be jettisoned each time there is a strike, since it represents such a negligible weight as to permit its inclusion as a permanent part of the tackle. As a result, the more conventional heavy and expensive sinker weights do not have to be reeled-in each time it is desired to inspect the line, and, further, these weights are not lost each time the hook becomes fouled or is struck. As a further advantage, the use of this permanently secured vane avoids the necessity of carrying a number of different weights for different depths desired, since the present vane can be adjusted for any depth simply by varying its depth-seeking inclination. A further advantage which might be noted more as a matter of interest than of patentable significance is that a vane of this type can be provided with a highly polished surface which, from experience, acts as an additional lure for the angler.

It is frequently desirable to direct vane 1 in a path laterally displaced from the trolling boat to avoid tangling adjacent lines. In the form illustrated in Fig. 1, this result can be accomplished by providing a rudder 37 detachably secured at its base 38 to one of the legs, such as 35 by a screw 39 which permits the rudder angle to be adjusted to direct the vane in the described course. Rudder 37 may also be used to compensate for any unbalanced condition of the vane that otherwise can cause an erratic movement. For similar reasons of stability and level-seeking balance, it also is desirable to add a weight 40 to the bow or leading end of the vane, the magnitude and size of such a weight to be determined by the relative size and weight of the vane.

Obviously many modifications and variations of the present invention are possible in the light of the above teachings. It is, therefore, to be understood that within the scope of the appended claims the invention may be practiced otherwise than as specifically described.

I claim:
1. Depth-seeking apparatus comprising a vane having a depth-seeking leading end and a surface-seeking trailing end, an elongate casing, means releasably connected to said casing for suspending said leading end from said casing, and means swingably secured to said trailing end for tautly suspending it from said casing, said trailing end normally being carried in an elevated position with respect to said leading end whereby said vane assumes a depth-seeking inclination, and said leading end being adapted upon release by said suspension means to swing to a position rearwardly of said trailing end, whereupon said vane assumes a surface-seeking inclination.

2. Depth-seeking apparatus comprising a vane having a depth-seeking leading end and a surface-seeking trailing end, an elongate casing, means releasably connected to said casing for suspending said leading end from said casing, and means swingably secured to said trailing end for tautly suspending it from said casing, said trailing end normally being carried in an elevated position with respect to said leading end whereby said vane assumes a depth-seeking inclination, and said leading end being adapted upon release by said suspension means to swing to a position rearwardly of said trailing end, whereupon said vane assumes a surface-seeking inclination, said leading end suspension means being adjustable in length for varying said depth-seeking inclination.

3. Depth-seeking trolling apparatus comprising a vane having a depth-seeking leading end and a surface-seeking trailing end, an elongate hollow casing, means releasably connected to said casing for suspending said leading end from the casing, and means swingably secured to said trailing end for tautly suspending it from the casing, said casing being provided with an opening for receiving said releasable means and a resilient latch in said casing adapted to reciprocably engage and release said releasable means and to project outwardly of the casing for attachment to a trolling leader, and said vane being provided with means for fixedly attaching a lure thereto, said vane-suspending means carrying said trailing end in an elevated position and said resilient latch being responsive to abnormal pulls exerted at both said leader and lure attaching means for releasing said leading end and permitting said trailing end to assume a surface-seeking inclination.

4. Depth-seeking trolling apparatus comprising a vane having a depth-seeking leading end and a surface-seeking trailing end, an elongate hollow casing, means releasably connected to said casing for suspending said leading end from the casing, and means swingably secured to said trailing end for tautly suspending it from the casing, said casing being provided with an opening for receiving said releasable means and a resilient latch in said casing adapted to reciprocably engage and release said releasable means and to project outwardly of the casing for attachment to a trolling leader, and said vane being provided with means for fixedly attaching a lure thereto, said vane-suspending means carrying said trailing end at an elevated position and said resilient latch being responsive to abnormal pulls exerted at both said leader and lure attaching means for releasing said leading end and permitting said trailing end to assume a surface-seeking inclination, said releasable suspension means being adjustable in length for varying said trailing end elevation.

5. Depth-seeking apparatus comprising a vane having a depth-seeking leading end and a surface-seeking trailing end, an elongate casing, means releasably connected to said casing for suspending said leading end from said casing and means swingably engaged with said trailing end for tautly suspending it from said casing, said trailing end normally being carried in an elevated position with respect to said leading end whereby said vane assumes a depth-seeking inclination, and said leading end being adapted upon release by its suspension means to swing to a position rearwardly of said trailing end, whereupon said vane assumes a surface-seeking inclination, said vane having a cross-sectional configuration to resist rotation about its longitudinal axis during its level-seeking movement.

6. Depth-seeking trolling apparatus comprising a vane having a depth-seeking leading end and a surface-seeking trailing end, an elongate hollow casing, means releasably connected to said casing for suspending said leading end from the casing and means swingably connecting the casing to said trailing end for tautly suspending it from the casing, said casing being provided with an opening for receiving said releasable means and a resilient latch in said casing adapted to reciprocably engage and release said releasable means and to project outwardly of the casing for attachment to a trolling leader, and said vane being provided with means for fixedly attaching a lure thereto, said vane-suspending means carrying said trailing end in an elevated position and said resilient latch being responsive to abnormal pulls exerted at both said leader and lure attaching means for releasing said leading end and permitting said trailing end to assume a surface-seeking inclination, said vane having a cross-sectional configuration throughout its lengths adapted to resist rotation about its longitudinal axis during its level-seeking movement.

7. Depth-seeking trolling apparatus comprising a vane having a depth-seeking leading end and a surface-seeking trailing end, an elongate hollow casing, means releasably connected to said casing for suspending said leading end from the casing, and means swingably secured to said trailing end for tautly suspending it from the casing, said casing being provided with a plurality of openings for selectively receiving said releasable means, a resilient latch mounted in said casing and adapted upon reciprocation to engage and release said releasable means, said latch projecting outwardly of the casing for attachment to a trolling leader, and said vane being provided with means for fixedly attaching a lure thereto, said vane-suspending means carrying said trailing end at an elevated position and said resilient latch being responsive to abnormal pulls exerted at both said leader and lure attaching means for releasing said leading end and permitting said trailing end to assume a surface-seeking inclination, said releasable suspending means being adjustable in length for varying said trailing end elevation.

References Cited in the file of this patent
UNITED STATES PATENTS

| | | |
|---|---|---|
| 2,192,800 | Peterson | Mar. 5, 1940 |
| 2,488,475 | Merritt | Nov. 15, 1949 |
| 2,522,516 | Jablon | Sept. 19, 1950 |
| 2,562,054 | Mathieu | July 24, 1951 |
| 2,566,029 | Louthan | Aug. 28, 1951 |
| 2,589,260 | Jablon | Mar. 18, 1952 |